D. M. CUMMINGS.
WOODEN-BLADED SHOVEL.
No. 172,263. Patented Jan. 18, 1876.

UNITED STATES PATENT OFFICE.

DANIEL M. CUMMINGS, OF ENFIELD, ASSIGNOR OF TWO-THIRDS HIS RIGHT TO B. FRANK BROWN, OF TILTON, NEW HAMPSHIRE, AND WILLIAM A. RUSSELL, OF LAWRENCE, MASSACHUSETTS.

IMPROVEMENT IN WOODEN-BLADED SHOVELS.

Specification forming part of Letters Patent No. 172,263, dated January 18, 1876; application filed September 4, 1875.

*To all whom it may concern:*

Be it known that I, DANIEL M. CUMMINGS, of Enfield, county of Grafton, State of New Hampshire, have invented certain new and useful Improvements in Wooden-Bladed Shovels; and I do hereby declare that the following is a full and exact description thereof, which will enable others skilled in the art to which it pertains to make and use the same, reference being had to the accompanying drawings, and to the letters of reference marked thereon, which form a part of this specification.

My invention consists in a shovel made of wood. The blade and handle are of different pieces, spliced and bound with metallic straps, so as to secure the greatest amount of strength with least amount of material and weight, as will be more fully explained by the following description:

In the annexed drawings, Figure 1 is a plan, with a section of the upper end of the handle. Fig. 2 is side view, with a section of blade and handle at the splice. Fig. 3 is a section of the blade on line $g$ in Fig. 1. Fig. 4 is the reverse of Fig. 1, with a long handle. Fig. 5 is an end view of the blade. Fig. 6 is a full-sized section of the front of the blade, with folded strap and rivet, on line $d$ in Fig. 1. Fig. 7 is a section of the blade on line $k\,h$ in Fig. 1. Fig. 8 is a plan of the front strap before it is folded.

The letters of reference are as follows: A is a machine-cut blade, deep or shallow at the back end, where it is thicker and tapers to the front end, as shown in section, Fig. 2, on lines $b\,c$ in Fig. 1. The sides are elliptical or segmental, as desired. A portion of the back end is the same. The balance and front end are straight, except the portion of the sides that turn up, as shown in Figs. 5 and 7. The front end is cut down the thickness and width of the strap G on the inside, and beveled on the outside about half as far back, as shown in section, Fig. 6, on line $d$ in Fig. 1. B and K are handles spliced to the blade A by the notch cut, as shown in section, at $f$, Fig. 2, and held by straps E and H, riveted, as shown in Figs. 1, 2, 4, and 7. C is a wooden cross-handle. D D are metallic straps. The upper end has a beveled recess, into which the end of the handle C fits, and is held by a rivet, as shown in section at $a$, Fig. 1, on line $l\,m$, Fig. 2. The lower ends are fitted to the circle of the handle B, and are riveted to it on opposite sides with a space between, as shown in Figs. 1 and 2. E and H are metallic blade and handle splice-straps. F and I are metallic straps formed to fit the back end of blade A. The strap F is angled to fit the inside, and the strap I is fitted to the outside, and both are riveted to blade A, as shown in section, Fig. 3, on line $g$, Fig. 1. G is a metallic strap, cut as shown in Fig. 8, folded to fit the front of blade A, on the bevel to which it is held in the middle by large-headed rivets, L, as shown in section, Fig. 6. The ends $e\,e$ are folded over the wood and corners of plate G on the bevel, and riveted, as shown in Figs. 1 and 4.

The intention is to use this shovel, made of different widths, depths, lengths, and forms of handle, for all purposes where a large shovel of light weight is desirable. For ordinary use, the shovels will be of sheet-steel at the point, and sheet-iron at the back and splice. For snow, the blades will be shallow. For grain, country produce, &c., of deeper form, and thicker at the front, to prevent injury to fruit, &c.

I am aware of the existence of wooden shovels made of one piece, blade and handle; also, of the ordinary splice of a steel-bladed shovel. I make no claim to the straps E and H, only what is different in shape to suit this splice in connection with straps F and I.

What I claim as my invention, and desire to secure by Letters Patent, is—

1. The re-enforcing pieces F I, in combination with the clasping-sockets E H, and handle B, cut away, as shown at $f$, to receive the upper end of the wooden blade A, as shown.

2. The metal re-enforcing and protecting strip G, cut away, as shown at $e\,e$, to form overlapping lips, in combination with the wooden blade A, as described.

DANIEL M. CUMMINGS.

Witnesses:
LORENZO DAY,
C. G. MORGAN.